United States Patent
Buck et al.

[15] 3,698,514
[45] Oct. 17, 1972

[54] COOLING AND LUBRICATION FOR HIGH SPEED ROTATING SYSTEMS

[72] Inventors: Willard E. Buck, Los Gatos; Robert J. Herbold, Sunnyvale; Randy J. Sherman, San Jose, all of Calif.

[73] Assignee: Technical Operations Incorporated, Burlington, Mass.

[22] Filed: Aug. 28, 1969

[21] Appl. No.: 854,029

Related U.S. Application Data

[63] Continuation of Ser. No. 668,375, Sept. 18, 1967, abandoned.

[52] U.S. Cl..................184/6.4, 184/104 R, 308/76
[51] Int. Cl................................................F01m 1/18
[58] Field of Search..........184/1, 1 E, 6 E, 6 F, 6, 18, 184/104, 104 B; 308/76

[56] References Cited

UNITED STATES PATENTS

| | | |
|---|---|---|
| 1,108,064 | 8/1914 | Bonom....................308/76 |
| 1,553,149 | 9/1925 | Doran.......................184/6 |
| 1,634,768 | 7/1927 | Bonner....................184/18 |
| 2,573,597 | 10/1951 | Paden.....................308/76 |
| 2,664,173 | 12/1953 | Kario........................184/6 |

*Primary Examiner*—Manuel A. Antonakas
*Attorney*—Frank A. Steinhilper

[57] ABSTRACT

A high speed rotating system driven by a motor which constitutes a source of heat. The system has bearings of porous material through which a liquid coolant is fed and in which heat of friction causes vaporization of the lubricant and hence cooling of the bearing and dissipation of heat from the motor due to the fact that the latent heat of vaporization is derived from the bearing surface and immediately adjacent areas.

4 Claims, 2 Drawing Figures

INVENTORS
WILLARD E. BUCK
ROBERT J. HERBOLD
RANDY J. SHERMAN
BY
*Fryer Tjensvold Feix Phillips & Lempio*
ATTORNEYS

COOLING AND LUBRICATION FOR HIGH SPEED ROTATING SYSTEMS

CROSS REFERENCE TO RELATED APPLICATION

This application is a continuation of application, Ser. No. 668,375 filed Sept. 18, 1967, assigned to the assignee of the present invention and now abandoned.

OBJECTS OF THE INVENTION

One example of a high speed rotary system is in connection with the rotating mirror for a very high speed camera. In many cases a small mirror which swings a beam of light containing the image of an event to be recorded rotates at a rate of many thousands of revolutions per second. Even with small journals in the order of 0.10 inch or less in diameter, conventional bearings are unacceptable. Bearings utilizing liquid as a lubricant have been used with limited success. Difficulties encountered result in part from excessive heating of the bearing and liquids. Also since the camera housings are partially evacuated to prevent image distortion and reduce the power required to rotate the mirror, there is a tendency for vaporized lubricant to enter the housing and contaminate the optical components by condensing upon them. There are many other environments in which very high speed rotation is required and some examples are code discs and memory drums in computors and the present invention is adapted to use in these environments.

There are also cases where an electric motor is employed to rotate a mirror or the like and the mirror is connected to or formed as an integral part of the rotor of the electric motor and, since the motor itself produces heat, the cooling of the bearing as taught by the present invention also serves to dissipate this heat.

It is the object of the present invention to overcome the difficulties mentioned above and to provide a bearing lubricated with a constant supply of low viscosity liquid and utilizing the very same heat in the bearing caused by friction as latent heat of vaporization to dissipate heat from the bearing and adjacent heat producing motor means.

Another object is to provide a bearing having unusually long life in operation.

Further objects and advantages of the invention and the manner in which it is carried into practice are made apparent in the following specification wherein reference is made to the accompanying drawing.

DESCRIPTION OF THE PREFERRED EMBODIMENTS

Figure 1:
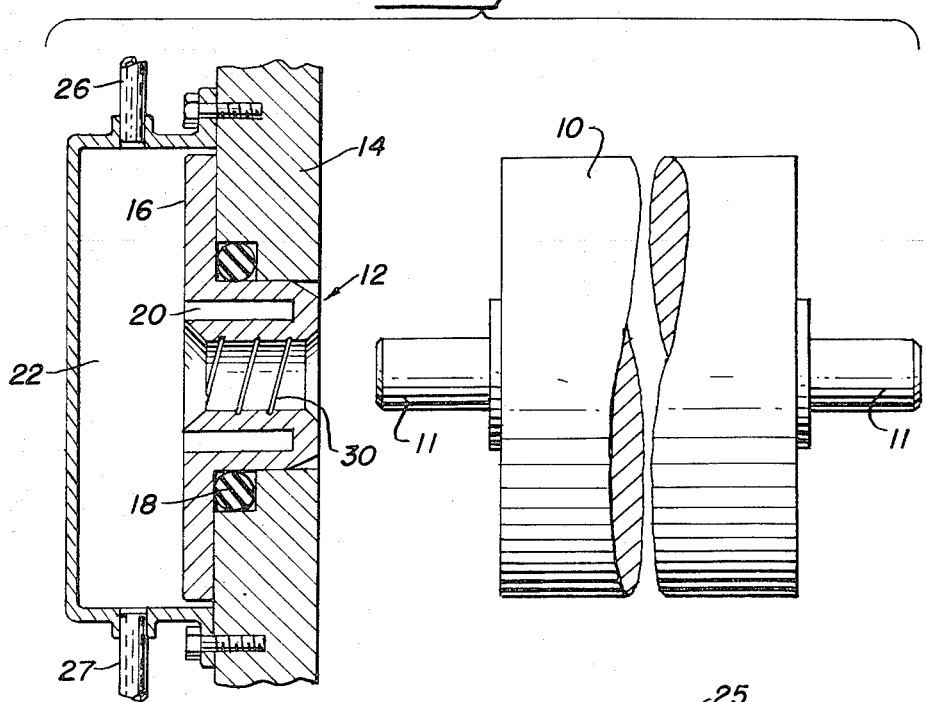
FIG. 1 is a sectional view of a bearing embodying the present invention with a mirror, motor or other rotary mechanism schematically represented as separated therefrom.

In FIG. 1, a combination mirror and motor of an electric motor-mirror operable at high speed is schematically shown at 10 as having journals 11 to be received within bearings, one of which is generally indicated at 12. The bearing 12 is received in a suitable opening in a wall, part of which is illustrated at 14, which may be a camera housing. The bearing has a flange 16 fitting against the outer side of the wall and a suitable seal is provided as by an O-ring 18 between the wall and the flange. The annular portion of the bearing which surrounds the actual bearing surface is provided with an annular well 20 which is concentric to the bearing surface. The bearing is formed of porous material such for example as sintered bronze or a suitable ceramic or plastic so that liquid can pass through the thin wall between the well 20 and bearing surface. A liquid lubricant or coolant is passed under pressure through a chamber 22 so that it is always present in the well 20.

Figure 2:
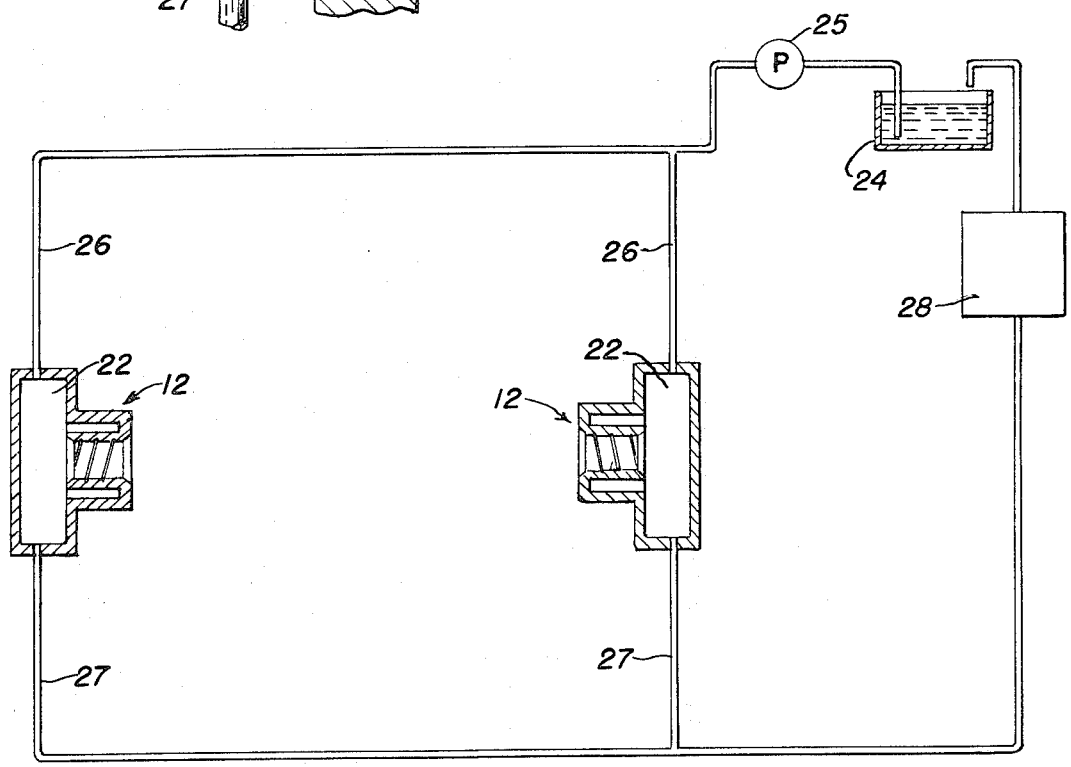
FIG. 2 is a schematic illustration of a system for circulating lubricant through a pair of bearings.

Referring to FIG. 2, the liquid is contained in a reservoir 24 and directed by a pump 25 to the chambers 22 for two bearings through feed line 26 and returned by return lines 27 to the reservoir and a heat exchanger represented at 28 may be employed in the return line if desired. A sealant may be provided on those surfaces of the annular portion of the bearing which communicate with the interior of the housing 14 so that lubricant passing into the housing may be controlled. The interior of the bearing surface is provided with a helical groove represented at 30 arranged to return lubricant or direct its flow from the bearing area back into the chamber 22. Because of the proximity of the annular well 20 to the bearing surface, a cooling effect is obtained and even distribution of lubricant to between the bearing surface and the journal is effected.

Generally speaking it is undesirable to admit liquid to the interior of a camera housing where, by condensing on the surfaces of the optical components, it can cause poor results photographically. Such liquid is also undesirable in computor chambers where close tolerances are held between high speed components. In the present bearing, the amount of coolant entering the housing is minimized by the helical groove 30 in the bearing which tends to feed the coolant in the other direction. The temperature of the bearing tends to be greatest at its inner end adjacent the low pressure chamber where it is not served as well by the cooling effect of liquid in the annular well 20 and also absorbs heat from the rotating mechanism 10. With a lubricant having the desired characteristics, vaporization takes place at the inner end and tends to cool or reduce the temperature in the most critical areas of the assembly.

The liquid used as a lubricant also has a low vapor pressure which tends to prevent it from condensing within the housing. There are several liquids which have the desired characteristics for the bearing described, some examples of which are xylenol, napthalene and amyl alcohol.

It is important that the vapor pressure of the liquid, the vacuum in the chamber and the operating temperature are properly related to obtain the result described. Other factors which must be taken into account in the adaptation of the bearing of the present invention to different specific environments are porosity of the bearing material, viscosity of the liquid, bearing clearance, size and pitch of the groove and the speed of the shaft.

What is claimed is:

1. The combination including housing means defining at least a part of a chamber adapted to be evacuated, a shaft extending into the chamber for supporting apparatus for high speed rotation in the chamber, and a bearing assembly supported by said housing means and receiving said shaft for cooling and lubricating said shaft, comprising annular sleeve bearing means having one end opening into the chamber for receiving said shaft;
well means defining an enclosure; and
a low vapor pressure lubricative coolant fluid received in said enclosure, said fluid being in communication with an interface formed in said bearing means between said shaft and said bearing means, fluid from said well means being caused when the chamber is evacuated to migrate into said interface and ultimately to the chamber at least in part by the pressure differential existing between the chamber and the fluid in said enclosure, whereby upon reaching the chamber said fluid evaporates to effect a cooling of the optical apparatus and bearing assembly, the evaporation of said fluid minimizing the problem of contamination of the apparatus.

2. The combination including housing means defining at least a part of a chamber adapted to be evacuated, a shaft extending into the chamber for supporting optical apparatus for high speed rotation in the chamber, and a bearing assembly supported by said housing means and receiving said shaft for cooling and lubricating said shaft, comprising:

annular sleeve bearing means formed from a porous heat-conductive material, and having one end opening into the chamber for receiving said shaft;
annular well means defining an enclosure substantially surrounding said bearing means; and
means for supplying said enclosure in said well means with a low vapor pressure lubricative coolant fluid, said fluid being in communication and heat transfer relationship with an interface formed in said bearing means between said shaft and said sleeve, fluid from said well means being caused when the chamber is evacuated to migrate into said interface and ultimately to the chamber at least in part by the pressure differential existing between the chamber and the fluid in said enclosure, whereby upon reaching the chamber said fluid evaporates to effect a cooling of the apparatus and bearing assembly, the evaporation of said fluid minimizing the problem of contamination of the optical apparatus.

3. The combination defined by claim 2 wherein the inner surface of said bearing means contains helical grooves arranged to direct said fluid away from the evacuated chamber when said shaft is rotated in a predetermined direction.

4. The combination defined by claim 3 wherein said fluid is selected from the group consisting of napthalene, xylenol, and amyl alcohol.

* * * * *